United States Patent [19]
Yeh et al.

[11] Patent Number: 5,691,826
[45] Date of Patent: Nov. 25, 1997

[54] TRANSMISSION MECHANISM FOR A SCANNER

[75] Inventors: Yu-ming Yeh; Yang-teh Lee, both of Taipei, Taiwan

[73] Assignee: Behavior Tech Computer Corporation, Taipei, Taiwan

[21] Appl. No.: 689,915

[22] Filed: Aug. 16, 1996

[51] Int. Cl.⁶ .............................. H04N 1/04; B65H 5/00
[52] U.S. Cl. .......................... 358/498; 358/412; 358/414; 74/421 A; 74/421 R; 271/10.04
[58] Field of Search ............................ 358/498, 412, 358/414; 74/421 A, 421 R, 606 R, 810; 271/10.04, 10.13

[56] References Cited

U.S. PATENT DOCUMENTS

| | | | |
|---|---|---|---|
| 4,931,834 | 6/1990 | Suga | 355/200 |
| 5,033,891 | 7/1991 | Kitazume et al. | 271/10.04 |
| 5,315,751 | 5/1994 | Hammer | 29/598 |

*Primary Examiner*—Edward L. Coles, Sr.
*Assistant Examiner*—Mark Wallerson
*Attorney, Agent, or Firm*—Foley & Lardner

[57] ABSTRACT

A transmission mechanism for a scanner includes a frame having a plurality of holes with different sizes and a series of gears mated with each other through different numbers of teeth. Due to different locations of where the transmission mechanism are mounted, the frame is able to be adapted to different type of motors.

9 Claims, 3 Drawing Sheets

TRANSMISSION MECHANISM FOR A SCANNER

FIELD OF THE INVENTION

The present invention generally relates to a transmission mechanism, and more particularly to a transmission mechanism having a frame enabling a user to mount different kinds of step motors to fulfill various needs.

BACKGROUND OF THE INVENTION

Conventional scanners, due to their weights, sizes and prices, are portable, but such a scanner can not meet the requirements of high resolution. Therefore, desk-scanners with high resolution have been developed. Although there are different kinds of scanner on the market for various purposes, their structures are practically the same. The main difference between a portable type scanner and a desk type scanner is the transmission mechanism. Taking a scanner with 300 DPI resolution as an example, normally a manufacturer may choose a PM (Permanent Magnetet) TYPE step motor or a HYBRID TYPE step motor associating with different transmission mechanism, according to their respective rotating speed, to accomplish a purpose of deceleration or driving a paper roller. Because the step-angle of the PM TYPE is 7.5°, and the step-angle of the HYBRID TYPE is 1.8°, the manufacturer can only choose either the PM TYPE or the HYBRID TYPE facilitated with different transmission mechanism mounted on different frames. To meet the market requirements, scanner manufacturers will thus have to have two product lines each producing a specific frame for each type of motor, which increases cost to the manufacturers. If the scanner manufacturers have two product lines producing different frames for different motors, they further have to have other product lines producing different gears, which is significantly detrimental to the financial situation to the manufacturers.

Thus, the transmission means for a scanner constructed in accordance with the present invention tends to mitigate and/or obviate the aforementioned problems.

SUMMARY OF THE INVENTION

The main objective of the invention is to provide a transmission mechanism for a scanner, which uses a single frame having a gear set mounted thereon for adapting two different kinds of motor.

Another objective of the invention is to provide a transmission mechanism in which it is only necessary to replace a driving gear mounted on a driving shaft of the step motor and a first transmission gear set mated between the driving gear and the transmission mechanism to enable the adaption to an other type of motor.

Other objects, advantages and novel features of the invention will become more apparent from the following detailed description when taken in conjunction with the accompanying drawings.

BRIEF DESCRIPTION OF THE DRAWINGS

The present invention will now be better understood with reference of the accompanying drawings wherein.

DETAILED DESCRIPTION OF THE PREFERRED EMBODIMENT

The following description mainly focus on a scanner having 300 DPI resolution.

Figure 1:
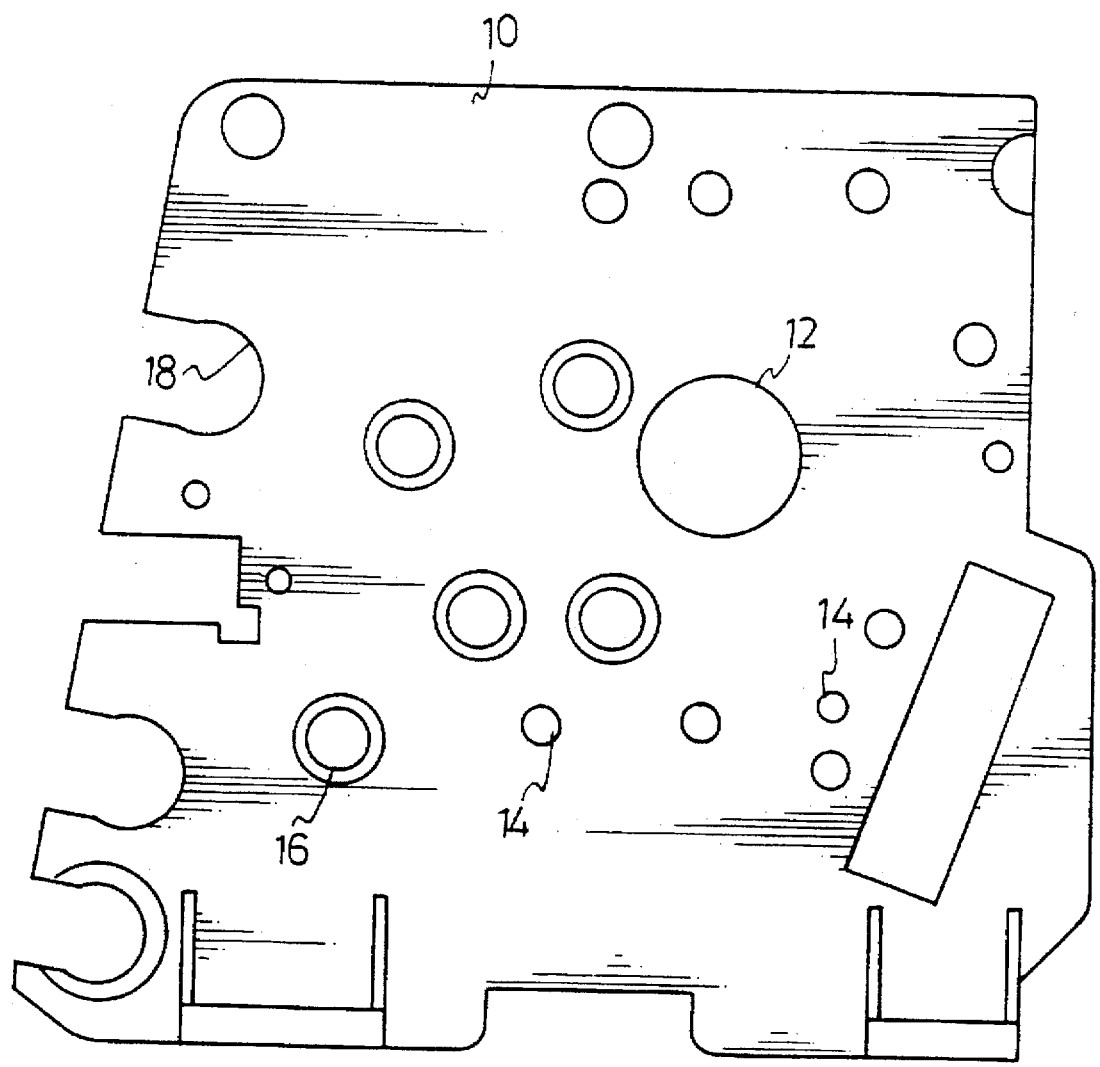
FIG. 1 is a plan view of a frame constructed in accordance with the present invention.
Figure 2:
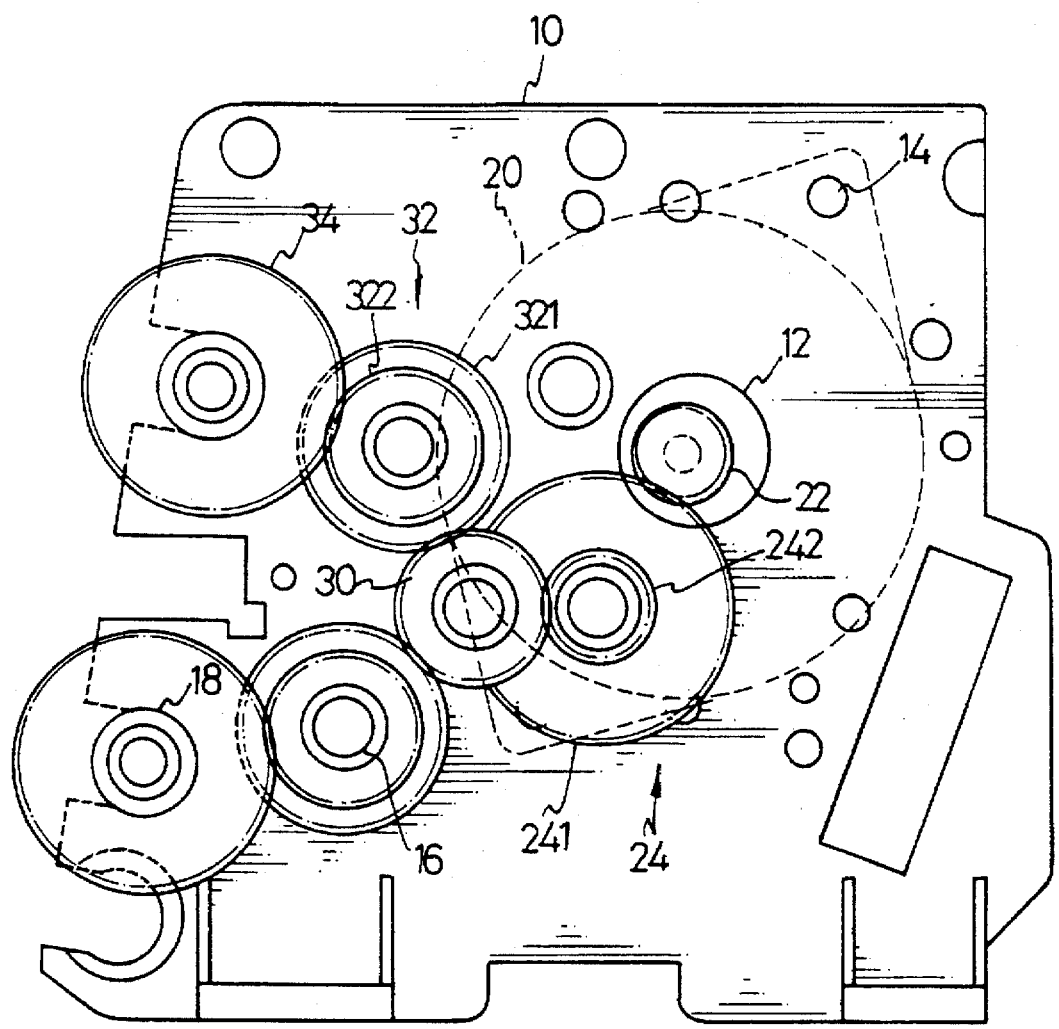
FIG. 2 is a schematic view of the frame shown in FIG. 1 associated with a PM TYPE step motor and an other related transmission mechanism.

Referring to FIG. 1, one preferred embodiment of a frame 10 of the invention is shown. The frame 10 has a main hole 12 for mounting a step motor 20 (as shown in FIG.2), a plurality of positioning holes 14 also for mounting the step motor, a plurality of first holes 16 for mounting transmission mechanism (not shown) and a plurality of notches 18 for mounting paper roller (not shown). The positioning holes 14 are disposed according to different types of step motor a user may choose.

It is shown in FIG. 2 that the step motor 20 of PM TYPE is affixed on the frame 10 via positioning holes 14, so that a driving gear 22 mounted on a driving shaft (not shown and numbered) is positioned onto the frame 10 by means of the driving shaft extending through the main hole 12. A first transmitting gear set 24 consists of a first big gear 241 and a first small gear 242. The first big gear 241 is mated with the driving gear 22 and the first small gear 242 is mated with an intermediate gear 30. The number of teeth of the driving gear 22 is 14X, of the first big gear 241 of the first transmitting gear set 24 is 45X, of the first small gear 242 is 17X and of the intermediate gear 30 is 25X, wherein X=N and N is natural number. The intermediate gear 30 is mated simultaneously with two second transmitting gear sets 32. A second small gear 322 having a shaft common to a second big gear 321 of each of the second transmitting gear set 32 is mated with a driven gear 34 to drive a paper roller (not shown). The number of teeth of the second big gear 321 of each of the second transmitting gear set 32 is 34X, of the second small gear 322 is 25X and of the driven gear 34 is 42X, wherein X=N and N is natural number.

Figure 3:
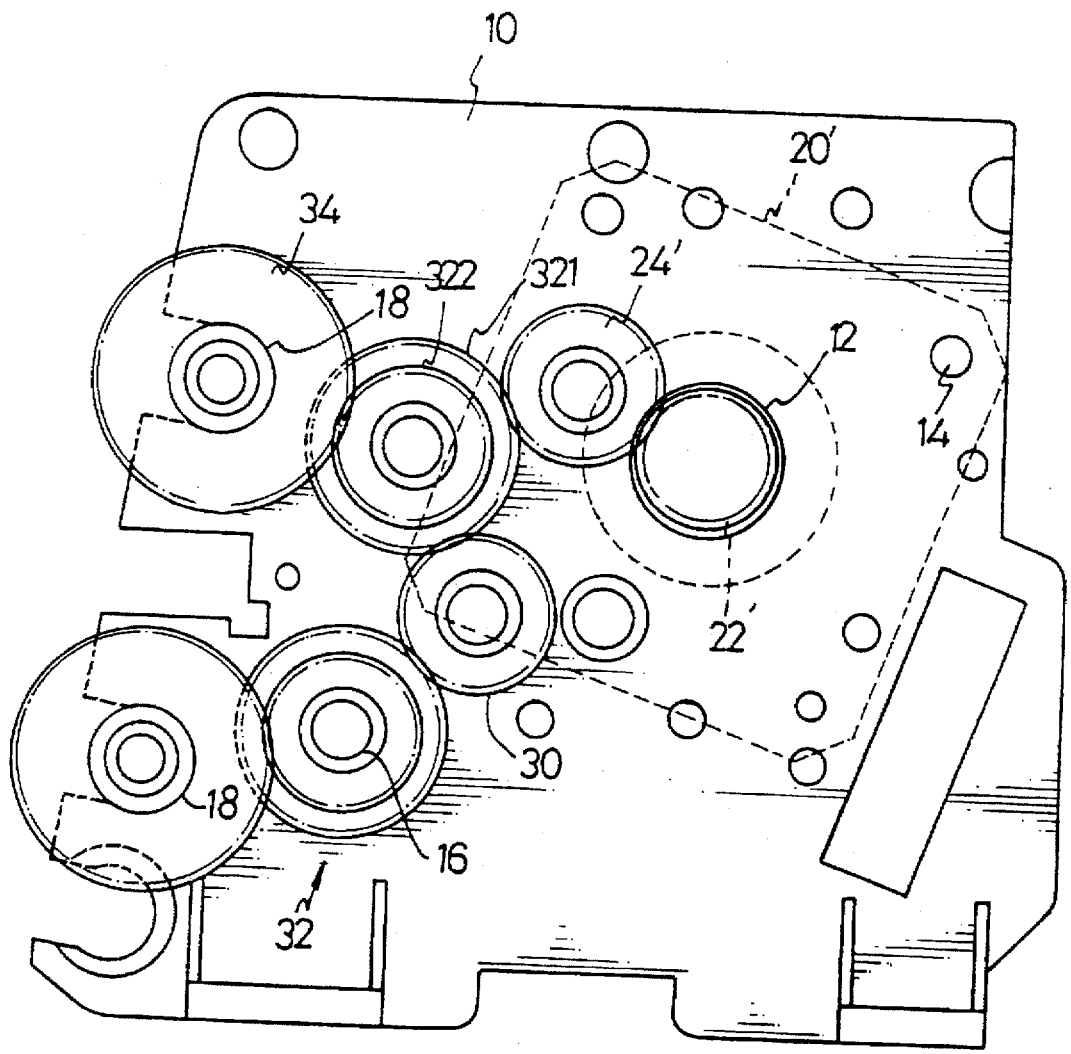
FIG. 3 is a schematic view of the frame shown in FIG. 1 associated with a HYBRID TYPE step motor and another related transmission mechanism.

By means of the structure described above, a final transmission will result from the driving gear 22 and the first transmitting gear set 24 of the PM TYPE step motor together with the frame 10, which is:

$$(7.5°×\pi/360°)×(14/45)×(17/25)×(25/34)×(25/42)×\phi=0.01212\phi(rad/step)$$

when $\phi=14$ mm (radius) the distance of every step of the step motor 20 is:

$$0.01212×14=0.16968 \text{ (mm/step)}$$

therefore, every half step of the step motor 20 will have resolution of 0.08484 mm/half-step Referring to FIG. 3, a step motor of HYBRID TYPE 20' is affixed on the frame 10 through the positioning hole 14, so that a driving gear 22' mounted on a driving shaft (not shown) of the step motor 20' is positioned on the main hole 12. A first transmitting gear 24' is mated with the driving gear 22' and a big gear 321 of a second transmitting gear set 32. The number of teeth of the driving gear 22' is 22X, of the first transmitting gear 24' is 25X. The intermediate gear 30, the second transmitting gear set 32 and the driven gear 34 are the same as those used in FIG. 2, and the mated patterns are also the same. Therefore, the number of teeth of the intermediate gear 30 is 25X, of the big gear 321 of the second transmitting gear set 32 mated with the intermediate gear 30 is 34X, of the small gear 322 having the same axis as the big gear 321 is 25X, of the driven gear 34 mated with the small gear 322 of the second transmitting gear 32 is 42X.

A final transmission (mm/step) will result from the combination of the HYBRID TYPE step motor 20', the driving gear 22' and the first transmitting gear set 24' together with the frame 10, which is:

$$(1.8° \times \pi/180°) \times (25/25) \times (25/34) \times (25/42) \times \phi = 0.01210 \phi \text{ (rad/step)}$$

when $\phi = 14$ mm (radius) the distance of every step of the step motor 20' is:

$$0.01210 \times 14 = 0.16940 \text{ (mm/step)}$$

and the resolution of every half step of the step motor 20' is:

$$0.08470 \text{ mm/half-step}$$

Normally, a final transmission of a scanner having 300 DPI is between 0.08450 mm~0.0850 mm/half-step. The resolutions of the two types of transmission mechanism mounted onto the same frame 10 will thus meet the requirement of the scanner having 300 DPI.

From the detailed description, it can be seen that, by means of one single frame 10, a scanner manufacturer is able to use two identical intermediate gears 30, two transmitting gear sets 32 and two driven gears 34 to associate with two different kinds of step motors, which accordingly reduces the cost dramatically.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A transmission mechanism for a scanner comprising a frame having a main hole and a plurality of positioning holes for mounting a step motor, a plurality of first holes for mounting a transmission mechanism having a driving gear and an intermediate gear and notches for mounting paper rollers, the improvement wherein;

said transmitting mechanism comprises a first transmission gear set having a first large gear mated with said driving gear and a first small gear mated with said intermediate gear and two second transmission gear sets each having a second small gear mated with a driven gear and two second big gears, said intermediate gear being mated with each of said two second big gears.

2. The transmission mechanism as claimed in claim 1, wherein the number of teeth of said intermediate gear is 25X, of said second big gear is 34X, of said second small gear is 25X, and of said driven gear is 42X, wherein X=N, and N is natural number.

3. The transmission mechanism as claimed in claim 1, wherein the number of teeth of said intermediate gear is 25, of said second big gear is 34, of said second small gear is 25, and of said driven gear is 42.

4. The transmission mechanism as claimed in claim 3, wherein the number of teeth of said driving gear is 14X, of said first big gear is 45X, and of said first small gear is 17X, wherein X=N, and N is a natural number.

5. The transmission mechanism as claimed in claim 4, wherein the number of teeth of said driving gear is 22X and of said first transmission gear is 25X, wherein X=N, and N is a natural number.

6. The transmission mechanism as claimed in claim 1, wherein said step motor has a step angle of 7.5° and said first transmission gear set comprises a first big gear mated with said driving gear and a first small gear mated with said intermediate gear.

7. The transmission mechanism as claimed in claim 1, wherein the number of teeth of said driving gear is 14, of said first big gear is 45 and of said first small gear is 17.

8. The transmission mechanism as claimed in claim 1, wherein said step motor has a step angle of 1.8° and said driving gear is mated with said first transmission gear which is mated with said second big gear of said second transmission gear set.

9. The transmission mechanism as claimed in claim 1, wherein the number of teeth of said driving gear is 22 and of said first transmission gear is 25.

* * * * *